WAITE & SENER.
Coffee Pot.
No. 14,748.
Patented April 22, 1856.
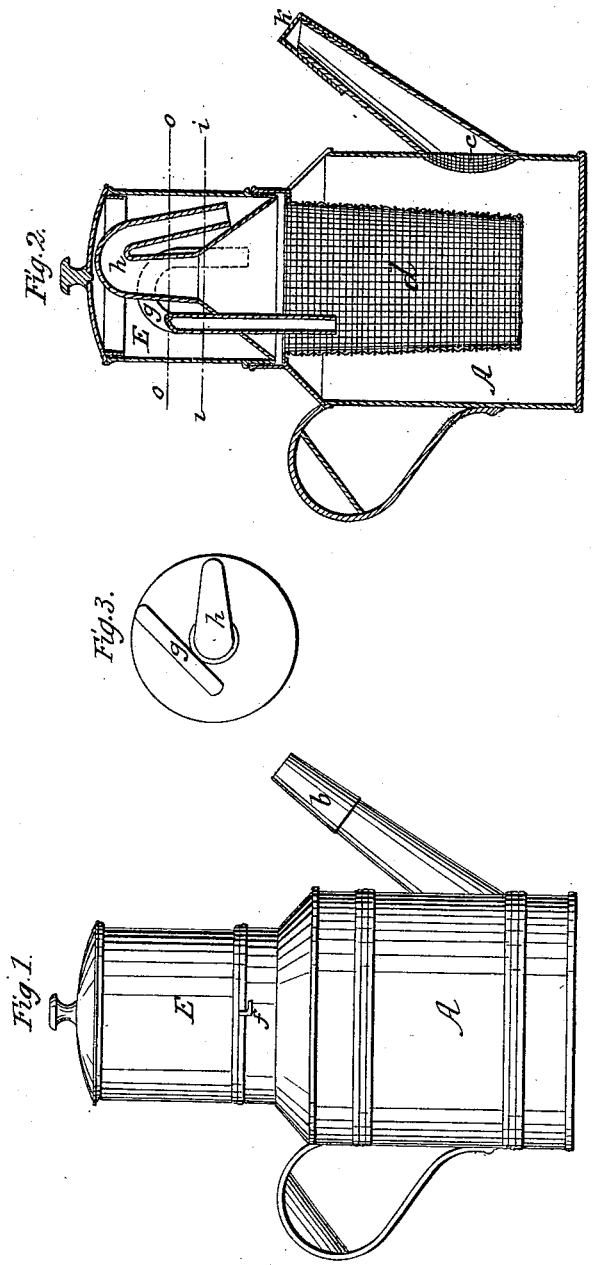

UNITED STATES PATENT OFFICE.

CHS. B. WAITE AND JOSEPH W. SENER, OF FREDERICKSBURG, VIRGINIA.

COFFEE-POT.

Specification of Letters Patent No. 14,748, dated April 22, 1856.

*To all whom it may concern:*

Be it known that we, CHAS. B. WAITE and Jos. W. SENER, both of Fredericksburg, in Spottsylvania county and State of Virginia, have invented certain new and useful Improvements in Coffee Pots or Boilers; and we do hereby declare that the following is a full, clear, and exact description thereof, reference being had to the accompanying drawing, through letters of reference marked thereon, forming part of this specification, and in which—

Figure 1, represents the exterior of the coffee pot or boiler. Fig. 2, is a section taken through the spout and handle of the same. Fig. 3, is a plan of the interior of the condenser.

The same letters occurring in the several figures denote corresponding parts.

Our invention consists in a novel and effective arrangement of the condensing apparatus of a coffee boiler, for preserving the fine aroma of the coffee, which escapes with the steam when boiled in an open or common boiler. For this purpose a variety of condensing boilers have been devised and patented all of which have been found to possess some objectionable feature either in the difficulty of clearing the danger of explosion, or the expense of construction, all of which we claim to have overcome, in the production of a self operating condensing boiler, every part of which is easily cleaned, of simple and cheap construction and perfectly safe.

To enable others to make and use our invention we will describe its construction, and operation by referring to the drawings in which—

A represents the boiler which may be made of any ordinary form constructed with the opening at the top somewhat contracted, but yet sufficiently large to pass the hand through for the purposes of cleaning; on the end of the spout is a cap or stopper (*b*) to prevent the escape of steam therefrom while boiling; a perforated plate or strainer (*c*) covers the opening of the spout inside the boiler; a cylindrical or cup formed strainer (*d*) may also be used inside the boiler to contain the coffee, if thought desirable; a cylindrical or other shaped chamber (E) is made to fit on the top of the boiler and is secured thereto by lugs (*f*) which tighten in the manner of a bayonet joint, or by a screw or other suitable device; this chamber (E), which we shall hereinafter call the condenser, is formed with a conical bottom, from the apex of which rises a tapering tube which is bent over and reaches downward very nearly to the bottom of the condenser; another (siphon formed) tube (*g*) is inserted in the condenser, the shorter leg of which is placed as near the bottom thereof as convenient to draw off its contents; the longer leg passing through the conical bottom of the condenser into the boiler; on the top of the condenser is a cover made to fit, either it, or the boiler when the condenser is removed.

There are two ways of using this boiler both of which we will now describe: 1st, the required quantity of water is put into the boiler and the coffee with it, or if the strainer (*d*) be used the coffee is measured into it, and inserted in the boiler; the spout being then stopped with the cap (*b*) and the condenser put onto the boiler with a small quantity of water in it, sufficient to cover the end of the steam pipe (*h*) about to the level indicated by the red line (*i*) when it is placed on the fire and made to boil as long as desired; the steam arising from the boiler passes over through the tube (*h*) into the water in the condenser, which absorbs all the aroma of the coffee; when boiled sufficiently, the condenser is filled up with cold water until the siphon (*g*) is covered when it is instantly charged and draws off the entire contents of the condenser into the boiler, which suddenly checks its boiling and causes it to settle down perfectly clear, ready for use. The second mode is by putting the coffee and water into the boiler as in the first case and filling the condenser with water to a little below the bend of the siphon say about the red line (*o*). The coffee is then made to boil rapidly as before, until the steam passing over into the condenser raises the water therein to the level of the bend of the siphon when it becomes charged and immediately drains the condenser into the boiler, when the coffee is ready for use; in this mode the time of boiling is regulated by the quantity of water first put into the condenser. If filled nearly to bend of the siphon it will take but a short time to raise it, by the condensed steam high enough to charge the siphon; if but a small quantity be put in it will take much longer. A little observation will show the user the best quantity to obtain the greatest amount of extract from a given quantity of coffee; some qualities of coffee will require more boiling than others, therefore it is not deemed advisable to lay down any fixed rule, suffice it to say that by varying the quantity of water put into the condenser the operation may be completed in from 2 to 30 minutes; during the time of making the coffee, the smell of it is not perceptible as in the use of the common or open boiler thus proving that all the aroma which flies off in the steam when using the common boiler, is retained in the condenser and eventually returned to the boiler, it will also be evident that as the steam at all times has a free escape into the condensing water instead of depending upon condensing surfaces surrounded by water as in other condensing boilers which must shortly become so much heated as to lose its effect, there is no possibility of explosion and as nothing but steam and water ever passes through the tubes they will not become foul while all the other parts of the apparatus are easily accessible for cleaning.

Having thus described our invention we wish to be understood that we do not claim a condensing coffee boiler but

What we do claim as new and desire to secure by Letters Patent is,

The arrangement herein described whereby the steam from the boiler is discharged into the water in the condenser which absorbs the aroma, in combination with the siphon for returning the contents of the condenser into the boiler substantially as set forth.

In testimony whereof we hereunto sign our names.

CHAS. B. WAITE.
JOSEPH W. SENER.

Witnesses:
F. P. WELLFORD,
GEO. W. EASTHAM.